US008804593B2

(12) United States Patent
Etemad et al.

(10) Patent No.: US 8,804,593 B2
(45) Date of Patent: Aug. 12, 2014

(54) FRAMEWORK FOR COORDINATED MULTIPOINT TRANSMISSION BASED ON A MULTICELL MAC/RRC DESIGN

(75) Inventors: Kamran Etemad, Potomac, MD (US); Alexei Davydov, Nizhny Novgorod (RU); Xiangying Yang, Portland, OR (US); Yuan Zhu, Beijing (CN); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 13/165,946

(22) Filed: Jun. 22, 2011

(65) Prior Publication Data

US 2012/0082082 A1    Apr. 5, 2012

Related U.S. Application Data

(60) Provisional application No. 61/389,080, filed on Oct. 1, 2010.

(51) Int. Cl.
*H04H 20/71* (2008.01)
*H04W 72/00* (2009.01)

(52) U.S. Cl.
USPC .......................................... 370/312; 455/450

(58) Field of Classification Search
USPC .................................. 370/312, 328–334, 338
See application file for complete search history.

(56) References Cited

U.S. PATENT DOCUMENTS

2011/0034175 A1*  2/2011  Fong et al. ..................... 455/450
2011/0077038 A1*  3/2011  Montojo et al. .............. 455/507

* cited by examiner

*Primary Examiner* — Afshawn Towfighi
(74) *Attorney, Agent, or Firm* — Cool Patent, P.C.

(57) ABSTRACT

Briefly, in accordance with one or more embodiments, two or more cells are configured to perform coordinated multipoint (CoMP) transmission for one or more user equipment devices with a common media access control (MAC) or a common radio resource control (RRC). Measurement information is received from the one or more user equipment devices. One or more of the cells may be deactivated, or one or more additional cells may be activated for coordinated multipoint transmission based at least in part on the measurement information.

27 Claims, 6 Drawing Sheets

FRAMEWORK FOR COORDINATED MULTIPOINT TRANSMISSION BASED ON A MULTICELL MAC/RRC DESIGN

CROSS-REFERENCE TO RELATED APPLICATIONS

The present application claims the benefit of U.S. Provisional Application No. 61/389,080 (P36288Z) filed Oct. 1, 2010. Said Application No. 61/389,080 is hereby incorporated herein in its entirety.

BACKGROUND

Coordinated Multi-Point (CoMP) is a technique that may be utilized to increase the performance of Fourth Generation (4G) wireless communication systems. Coordinated multipoint transmission may be utilized to increase throughput and service quality in wireless networks, particularly at or near the edge of a given cell in a cellular network. In contrast to carrier aggregation (CA) techniques which combine transmissions from two different carriers operating on two different frequencies to increase data rates, coordinated multipoint transmission involves using two carriers operating on the same frequency. Although CoMP has been proposed for 4G wireless communications, a consistent framework to define, activate, and schedule multiple cells to support CoMP transmission has yet to be defined.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
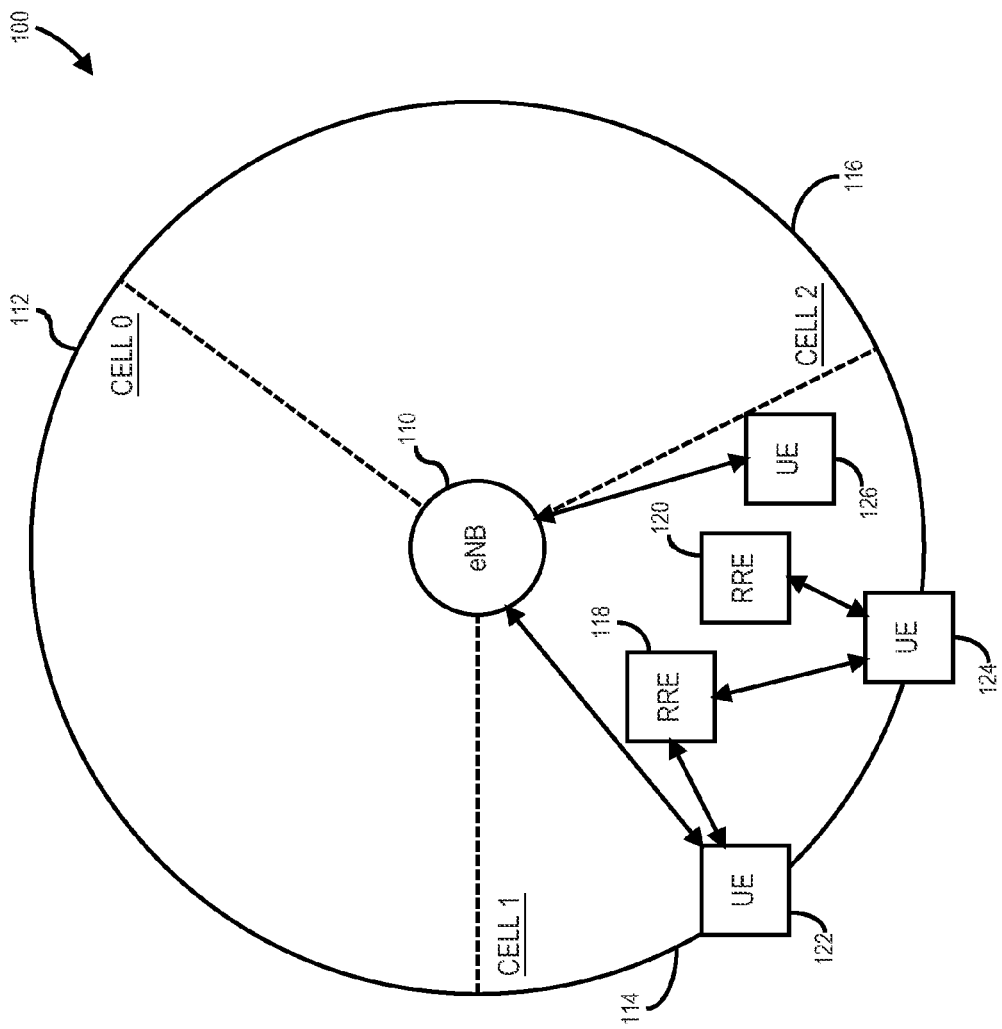
FIG. 1 is a diagram of an enhanced Node B (eNB) serving multiple sectors of multiple cells and capable of implementing coordinated multipoint (CoMP) transmission in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an enhanced Node B (eNB) serving multiple sectors of multiple cells and capable of implementing coordinated multipoint (CoMP) transmission in accordance with one or more embodiments will be discussed. As shown in FIG. 1, wireless communication network 100 may include an enhanced Node B (eNB) device 110 that may serve multiple sectors such as sector 112, sector 114, and sector 116 in respective cells, cell 0, cell 1, and cell 2, of a cellular communication system. In one or more embodiments, enhanced Node B 110 may be part of a Third Generation (3G) or Fourth Generation (4G) communication system in accordance with a Third Generation Partnership Project (3GPP) Long Term Evolution (LTE) standard. Alternatively, in some embodiments eNB 110 may be part of an Institute of Electrical Engineers (IEEE) IEEE 802.16 standard such as IEEE 802.16e or IEEE 802.16m standard to implement a Worldwide Interoperability for Microwave Access (WiMAX) network or a WiMAX-II standard, although the scope of the claimed subject matter is not limited in this respect. Although network 100 may be discussed with respect to a given standard, the claimed subject matter is not limited to any particular standard, or release or version of that standard, and may encompass further versions or releases of those standards including standards not yet in existence but which may come into existence in the future.

In a given sector 114, eNB may implement intra-eNB coordinated multipoint transmission (CoMP) wherein a single eNB 110 controls the CoMP operation. In such embodiments, one or more remote radio elements (RRE), also known as a remote radio unit (RRU), may be deployed within a single sector such as RRE 118 and RRE 120 deployed in sector 114 as shown in FIG. 1. The RREs may include radio-frequency (RF) circuits to enhance the coverage, throughput and/or link quality of eNB 110, for example to implement coordinated multipoint (CoMP) transmission and/or carrier aggregation. In such a network 100, one or more user equipment (UE) devices such as UE 122, UE 124, and/or UE 126 may communicate with eNB 110 and/or one or more of RRE 118 or RRE 120. In one or more embodiments, CoMP may be implemented wherein a common or shared media access control (MAC) and radio resource control (RRC) manage multiple physical (PHY) devices or cells such as RRE 118 and RRE 120 operating on the same frequency. Intra-eNB CoMP allows joint processing and beam forming across multiple cells, such as the RREs) within a single eNB. The cells may be implemented via different antenna orientations of the eNB to serve different sectors of the same cell site where eNB 110 is located, or alternatively the cells may be implemented via one or more remote radio elements such as RRE 118 and RRE 120 to provide local coverage within a given sector 114. Using multiple RREs may be referred to a distributed antenna system (DAS) deployment. An example of a framework of a common MAC/RRC controlling CoMP operation is shown in and described with respect to FIG. 2, below.

Figure 2:
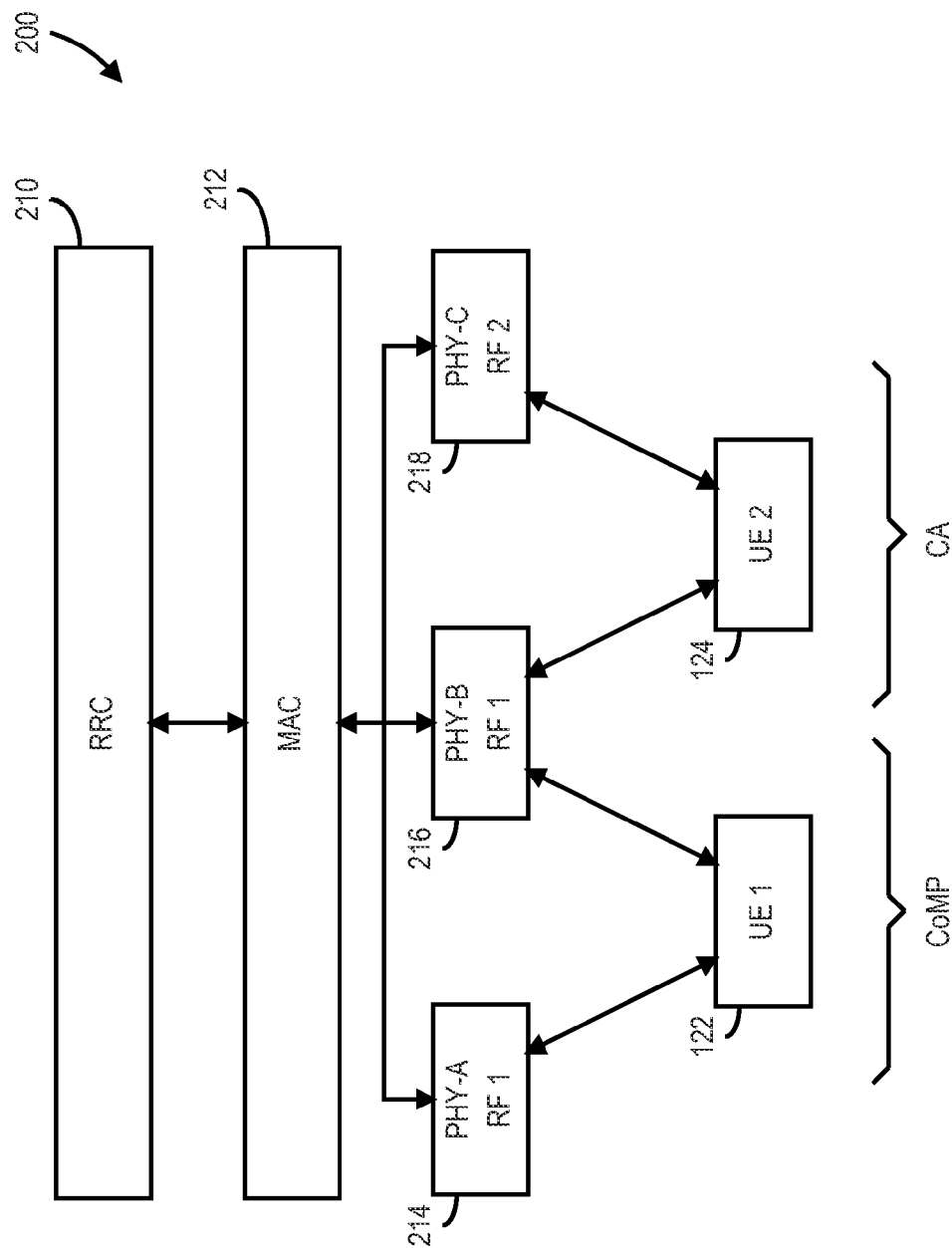
FIG. 2 is a block diagram of a framework to implement intra-eNB CoMP under the same radio resource control (RRC) with joint media access control (MAC) in accordance with one or more embodiments.

Referring now to FIG. 2, a block diagram of a framework to implement intra-eNB CoMP under the same radio resource control (RRC) with joint media access control (MAC) in accordance with one or more embodiments in accordance with one or more embodiments will be discussed. As shown in FIG. 2, framework 200 for implementing intra-eNB CoMP may comprise radio resource control (RRC) 210 and media access control (MAC) 212 to control multiple physical (PHY) devices represented as PHY-A 214, PHY-B 216, and/or PHY-C 218. Although FIG. 2 shows three physical devices for purposes of example, any number of physical devices may be implemented, and the scope of the claimed subject matter is not limited in this respect. As shown in FIG. 2, PHY-A 214 may operate on a first frequency (RF 1), PHY-B 216 may also operate on the first frequency (RF 1), and PHY-C 218 may operate on a second frequency (RF 2). Where user equipment such as UE 122 communicates with both PHY-A 214 and PHY-B 216 both operating on the same frequency (RF 1), coordinated multipoint (CoMP) may be implemented. Where user equipment such as UE 124 communicates with both PHY-B 216 and PHY-C 218 each operating on a different frequency, (RF 1) and (RF 2), respectively, carrier aggregation (CA) may be implemented.

In one or more embodiments, under framework 200, Per UE configuration and management of multiple Intra-eNB cells, which may be realized as sectors or RREs, may be controlled by an eNB under the same RRC 210 with joint MAC 212 operation. In one or more embodiments, such Intra-eNB cells may be distinguished by user equipment (UE) devices by their respective PHY layer cell identifications (Cell-IDs) for example as defined in the Long Term Evolution (LTE) standard Release 8, Release 9, and/or Release 10. Such a framework 200 may be utilized for scenarios in which multiple RREs are deployed with common Cell-IDs but with different PHY attributes, for example for example CSI-RS pattern, antenna port assignments, etc. as defined in a secondary cell configuration phase that is defined with respect to FIG. 5 and FIG. 6, below.

Figure 3:
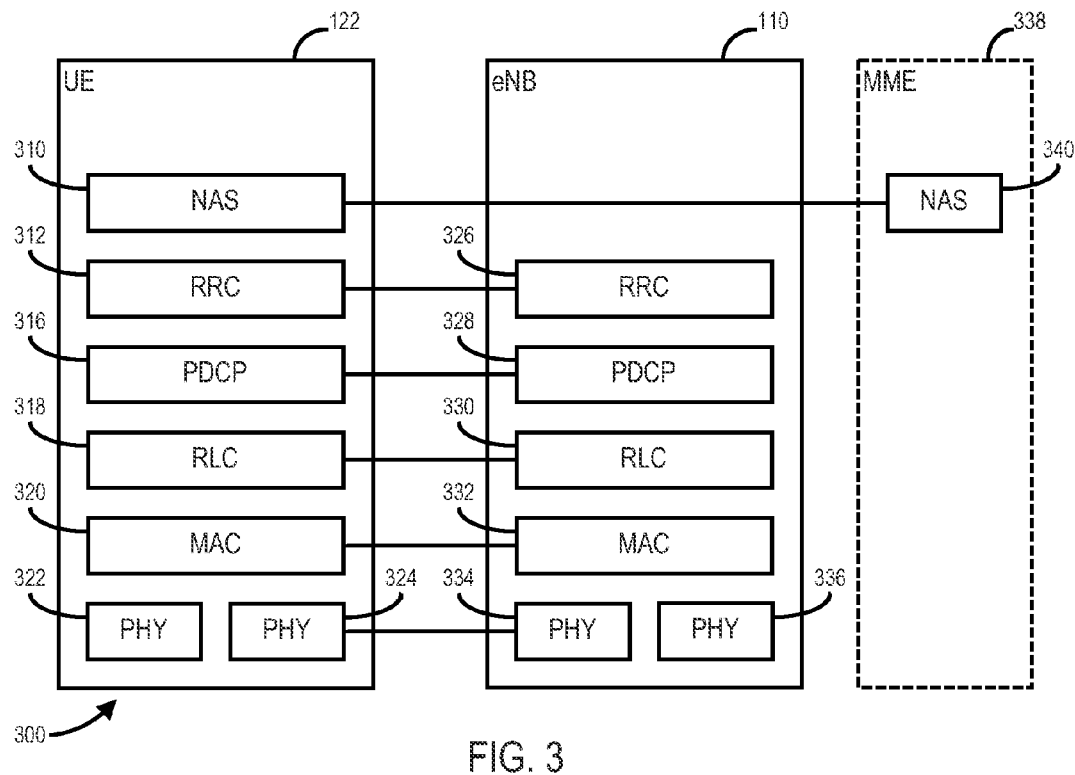
FIG. 3 is a block diagram of a control plane for implementing coordinated multipoint transmission in accordance with one or more embodiments.
Figure 4:
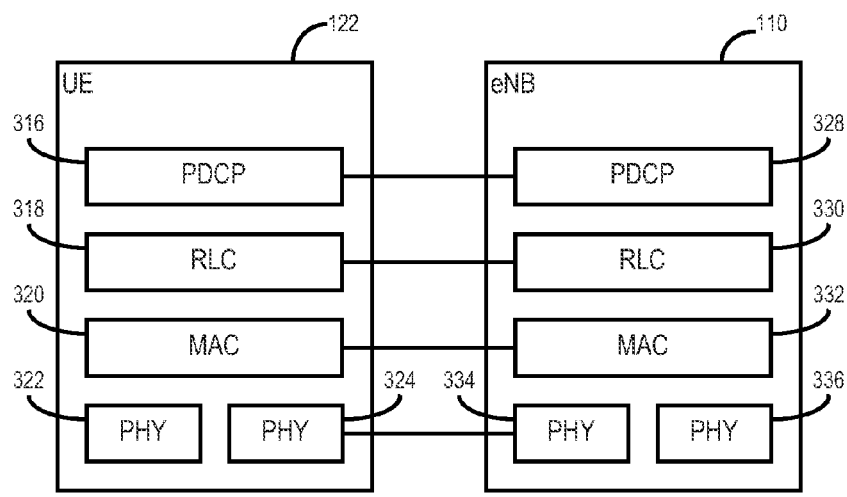
FIG. 4 is a block diagram of a data plane for implementing coordinated multipoint transmission in accordance with one or more embodiments.

Referring now to FIG. 3 and FIG. 4, block diagrams of a control plane and a data plane, respectively, for implementing coordinated multipoint transmission in accordance with one or more embodiments will be discussed. As shown in FIG. 3, control plane 300 comprises UE 122 coupled with eNB 110 and media management entity (MME) 338, wherein UE 122 comprises radio resource control (RRC) block 312, packet data convergence protocol (PDCP) block 316, radio link control (RLC) block 318, media access control (MAC) block 320, and physical layer (PHY) blocks PHY 322 and PHY 324. The eNB 110 likewise comprises RRC block 326, PDCP block 328, RLC block 330, MAC block 332, and PHY block PHY 334 and PHY 336 coupled to respective blocks of the UE 122. Furthermore, UE 122 includes NAS block 310 coupled to non-access stratum (NAS) block 340 of mobility management entity (MME) 338. Similarly, as shown in FIG. 4, data plane 400 comprises UE 122 coupled with eNB 110, wherein UE 122 comprises PDCP block 316, RLC block 318, MAC block 320, PHY block 322 and PHY block 324. The eNB 110 likewise comprises PDCP block 328, RLC block 330, MAC block 332, PHY block 334 and PHY block 336 coupled to respective blocks of the UE 122.

Figure 5:
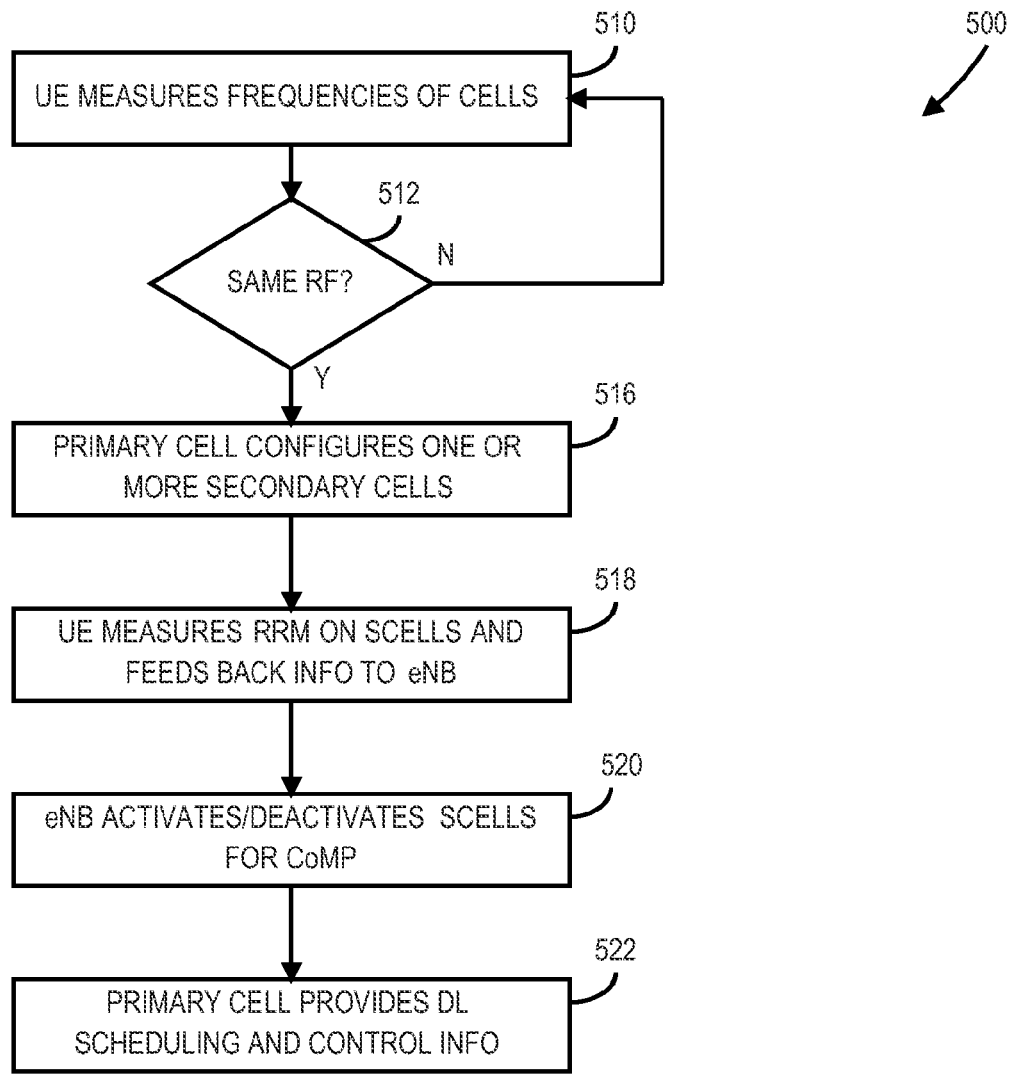
FIG. 5 is a flow diagram of a method to configure coordinated multipoint cells in accordance with one or more embodiments.

Referring now to FIG. 5, a flow diagram of a method to configure coordinated multipoint cells for a UE in accordance with one or more embodiments will be discussed. As shown in FIG. 5, method 500 may include more or fewer blocks, and/or in one or more alternative orders, than shown, and the scope of the claimed subject matter is not limited in these respects. For coordinated multipoint (CoMP), a primary cell may be selected by the eNB, and the user equipment such as UE 122 may be configured by the primary cell with additional cells on the same frequency. At block 510, UE 122 measures the frequencies on which the cells are operating. If the frequencies are the same as determined at block 512, then CoMP may be utilized. At block 518, UE 122 performs radio resource measurement (RRM) measurements on the secondary cells and feeds back the measurement information to the eNB 110 to further assist with CoMP operation. The eNB then activates or deactivates the secondary cells at block 520 for CoMP based at least in part on the RRM measurements obtained by the UE 122. In one or more embodiments, the measurements provided by the UE 122 and the feedback channels on the primary cell may be consistent with a similar approach as implemented with carrier aggregation techniques. At block 522, the primary cell provides cross carrier and cell downlink scheduling and control information which may also be consistent with a similar approach as implemented with carrier aggregation techniques. In one or more embodiments, the RRM measurements to support CoMP may not require an additional extension or extensions to the single carrier, non-CoMP communication arrangement. The RRM measurements may be set thresholds for which a cell may be eligible or ineligible for CoMP operation. Furthermore, in one or more embodiments, the primary cell may change based at least in part on the RRM measurements. For example, depending on how transparent a secondary cell or another cell may appear to the UE 122, such a primary cell change may either be a standard cell handover or specifically a primary cell change. Such transparency may refer to how the secondary cell or another cell operates in CoMP mode versus how it operates in a regular mode, for example whether the UE 122 will get the channel state indicator (CSI) for that cell operating under CoMP, and whether the UE 122 performs explicit PHY feedback for the cell. In the event those conditions are true, then a primary cell change for CoMP may be viable, and a future primary cell change for carrier aggregation may apply as well to intra-eNB CoMP.

Figure 6:
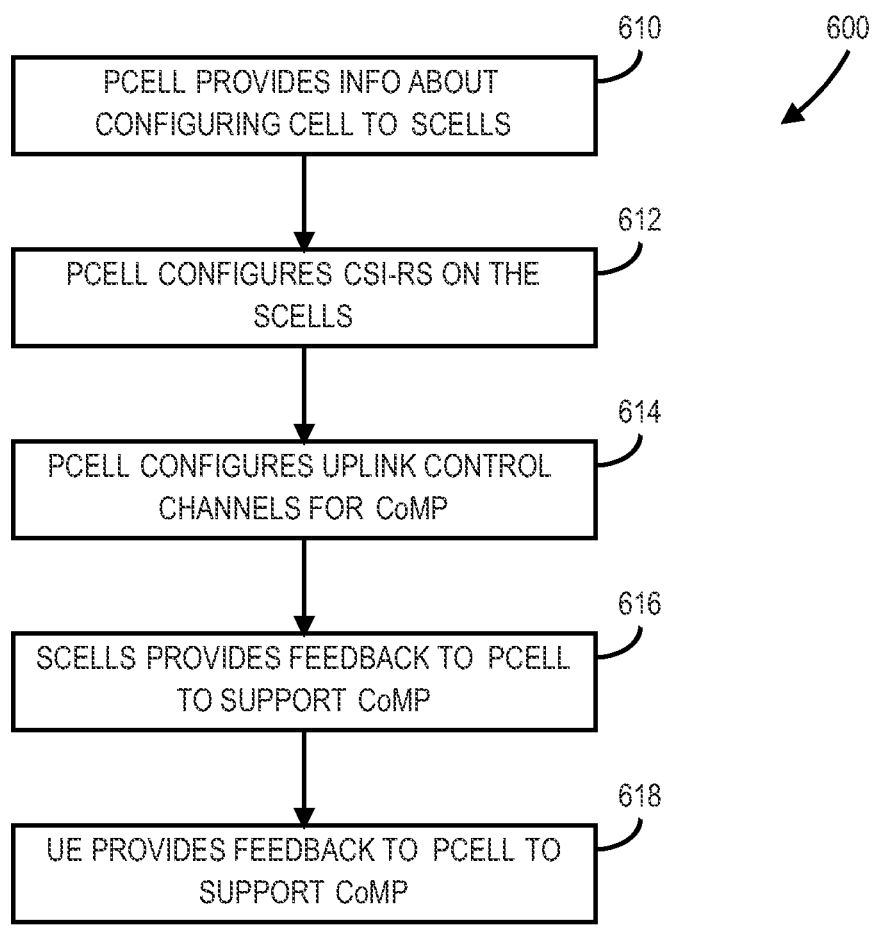
FIG. 6 is a flow diagram of a method to configure secondary cells for coordinated in accordance with one or more embodiments.

Referring now to FIG. 6, a flow diagram of a method to configure secondary cells for coordinated in accordance with one or more embodiments will be discussed. As shown in FIG. 6, method 600 may include more or fewer blocks, and/or in one or more alternative orders, than shown, and the scope of the claimed subject matter is not limited in these respects. In one or more embodiments, blocks 610, 612, and 614 may be performed in the downlink (DL), and blocks 616 and 618 may be performed in the uplink (UL). For the downlink, at block 610, the primary cell provides information about the configuring cell (the primary cell) to the secondary cells. Such information may include the number of cells being coordinated for CoMP, the cell identifications (Cell IDs), the number of antenna ports per each eNB, and so on. At block 612, the primary cell configures channel state information reference signals (CSI-RS) on the secondary cells, including subframe offset, duty cycle, the location of the CSI-RS within the downlink subframe, and so on. At block 614, the primary cell configures the uplink control channels for CoMP operation, including providing the feedback format, duty cycle, and so on. For the uplink, at block 616 the secondary cells provide feedback to the primary cell to support the CoMP mode of operation, including a precoding matrix index (PMI), channel quality indicator (CQI), rank indicator (RI), and so on.

In one or more embodiments, the measurement of the channels is performed by using channel state indicator (CSI) reference signals transmitted by the primary cell and secondary cells on different RREs. The CSI-RS configuration (duty cycle, subframe offset and intra-subframe location) of both cells will be provided by radio resource control (RRC) signaling of the primary cell. Furthermore, PDSCH muting may also be applied on the primary cell to enhance the channel measurements performance from the secondary cell. The UE 122 will also report feedback to the primary cell only, as indicated at block 618. In order to minimize the impact to the standard specification and simplify UE implementation for coordinated beamforming CoMP, feedback channels may be reused as specified in LTE Releases 8 through 10 which are based on PMI, CQI, and RI reports. In one or more embodiments, one modification to the present LTE Releases may include periodically replacing regular feedback information with feedback information related to CoMP operation, although the scope of the claimed subject matter is not limited in this respect. Furthermore, although Intra-eNB CoMP is discussed herein for purposes of example, in one or more embodiments the MAC 212 and RRC 210 control of CoMP of FIG. 2 may likewise be extended to implement Inter-eNB CoMP wherein multiple eNBs may operating on the same frequency may provide CoMP services to one or more UEs. Such an arrangement may involve modification of the inter-eNB interface and coordination between the eNBs, although the scope of the claimed subject matter is not limited in this respect.

Figure 7:
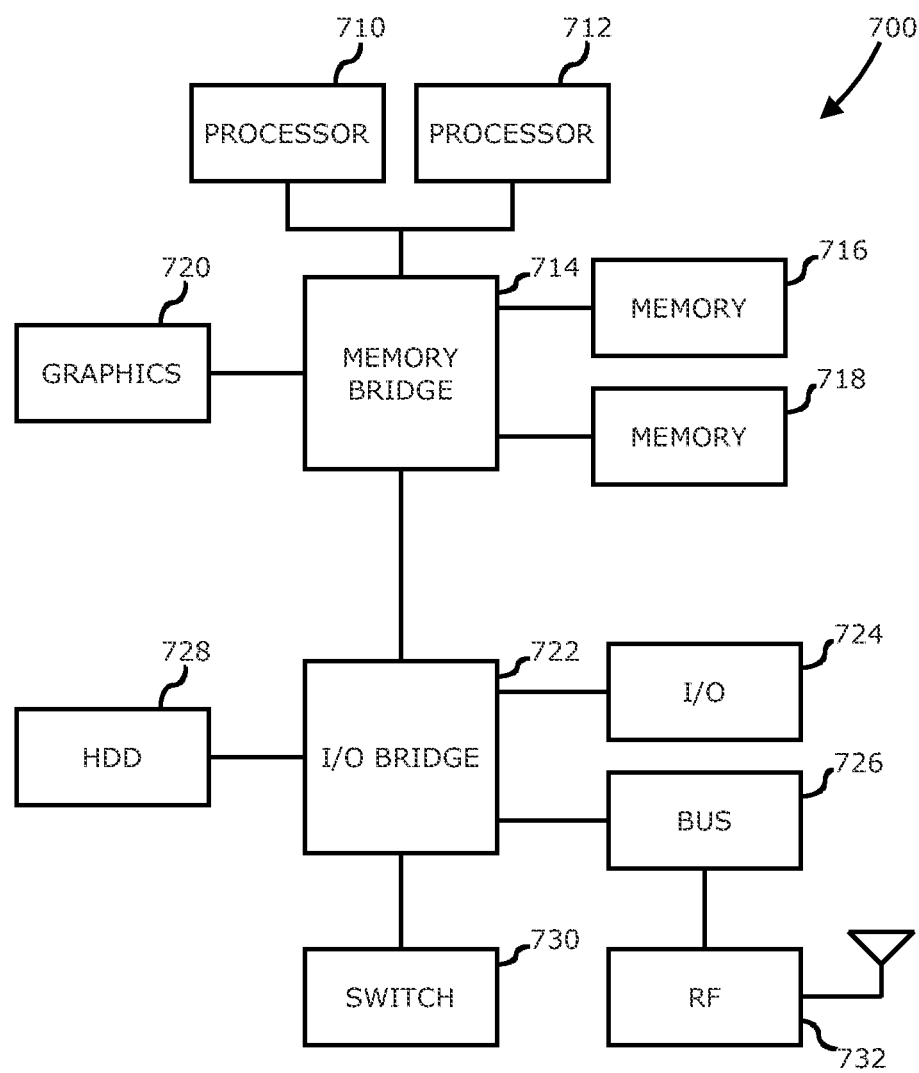
FIG. 7 is a block diagram of an information handling system capable of utilizing coordinated multipoint transmission in accordance with one or more embodiments.

Referring now to FIG. 7, a block diagram of an information handling system capable of utilizing coordinated multipoint transmission in accordance with one or more embodiments will be discussed. Information handling system 700 of FIG. 7 may tangibly embody one or more of any of the network elements of network 100 as shown in and described with respect to FIG. 1. For example, information handling system 500 may represent the hardware of enhanced Node B 110, RRE 118, and/or user equipment 122, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a radio-frequency (RF) block 732 comprising RF circuits and devices for wireless communication with other wireless communication devices and/or via wireless networks such as network 100 of FIG. 1, for example where information handling system 700 embodies eNB 110, RRE 118, and/or user equipment 122, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to coordinated multipoint transmission based on a multicell MAC/RRC design and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
 configuring two or more cells comprising a single enhanced Node B (eNB) and one or more remote radio elements (RREs) in a distributed antenna system (DAS) deployment to perform coordinated multipoint (CoMP) transmission for one or more user equipment devices with a common media access control (MAC) or a common radio resource control (RRC), or combinations thereof, wherein the two or more cells have a same cell identification (ID) and different physical (PHY) attributes;
 selecting one of the two or more cells as a primary cell and at least another of the two or more cells as a secondary cell;

receiving measurement information related to CoMP operation from the one or more user equipment devices on a feedback channel of the primary cell only, and from one or more secondary cells; and deactivating one or more of the cells or activating one or more additional cells for coordinated multipoint transmission based at least in part on the measurement information.

2. A method as claimed in claim 1, wherein the measurement information comprises radio resource measurement (RRM) measurements.

3. A method as claimed in claim 1, wherein two or more of the cells comprise different collocated antenna configurations of an enhanced Node B on a single cell site.

4. A method as claimed in claim 1, wherein the cells are distinguished based at least in part on a physical (PHY) layer cell identification (Cell-ID).

5. A method as claimed in claim 1, wherein said configuring comprises determining if two or more cells are operating on the same frequency for eligibility for coordinated multipoint operation, and otherwise configuring cells operating on different frequencies for carrier aggregation.

6. A method as claimed in claim 1, further comprising designating one of the cells as a primary cell, and one or more of the cells as a secondary cell, and providing downlink scheduling or control information, or combinations thereof, from the primary cell to the one or more secondary cells.

7. A method as claimed in claim 1, further comprising designating one of the cells as a primary cell, and one or more of the cells as a secondary cell, and configuring channel state information reference signals (CSI-RS) on the one or more secondary cells with the primary cell.

8. A method as claimed in claim 1, further comprising designating one of the cells as a primary cell, and one or more of the cells as a secondary cell, and configuring uplink control channels on the one or more secondary cells with the primary cell.

9. A method as claimed in claim 1, further comprising receiving feedback information from one or more of the cells, or one or more of the user equipment devices, or combinations thereof, to support coordinated multipoint transmission.

10. An apparatus, comprising:
a radio-frequency transceiver;
a processor coupled to the radio-frequency transceiver, wherein the processor is configured to cause the radio-frequency transceiver to:
configure two or more cells comprising a single enhanced Node B (eNB) and one or more remote radio elements (RREs) in a distributed antenna system (DAS) deployment to perform coordinated multipoint (CoMP) transmission for one or more user equipment devices with a common media access control (MAC) or a common radio resource control (RRC), or combinations thereof, wherein the two or more cells have a same cell identification (ID) and different physical (PHY) attributes;
select one of the two or more cells as a primary cell and at least another of the two or more cells as a secondary cell;
receive measurement information related to CoMP from the one or more user equipment devices on a feedback channel of the primary cell only, and from one or more secondary cells; and
deactivate one or more of the cells or activating one or more additional cells for coordinated multipoint transmission based at least in part on the measurement information.

11. An apparatus as claimed in claim 10, wherein the measurement information comprises radio resource measurement (RRM) measurements.

12. An apparatus as claimed in claim 10, wherein two or more of the cells comprise different collocated antenna configurations of an enhanced Node B on a single cell site.

13. An apparatus as claimed in claim 10, wherein the cells are distinguished based at least in part on a physical (PHY) layer cell identification (Cell-ID).

14. An apparatus as claimed in claim 10, wherein the processor is further configured to determine if two or more cells are operating on the same frequency for eligibility for coordinated multipoint operation, and otherwise configuring cells operating on different frequencies for carrier aggregation.

15. An apparatus as claimed in claim 10, wherein the processor is further configured to designate one of the cells as a primary cell, and one or more of the cells as a secondary cell, and provide downlink scheduling or control information, or combinations thereof, to the one or more secondary cells.

16. An apparatus as claimed in claim 10, wherein the processor is further configured to designate one of the cells as a primary cell, and one or more of the cells as a secondary cell, and configure channel state information reference signals (CSI-RS) on the one or more secondary cells.

17. An apparatus as claimed in claim 10, wherein the processor is further configured to designate one of the cells as a primary cell, and one or more of the cells as a secondary cell, and configure uplink control channels on the one or more secondary cells.

18. An apparatus as claimed in claim 10, wherein the processor is further configured to designate receiving feedback information from one or more of the cells, or one or more of the user equipment devices, or combinations thereof, to support coordinated multipoint transmission.

19. An article of manufacture comprising a storage medium having instructions stored thereon that, if executed, result in:
configuring two or more cells comprising a single enhanced Node B (eNB) and one or more remote radio elements (RREs) in a distributed antenna system (DAS) deployment to perform coordinated multipoint (CoMP) transmission for one or more user equipment devices with a common media access control (MAC) or a common radio resource control (RRC), or combinations thereof, wherein the two or more cells have a same cell identification (ID) and different physical (PHY) attributes;
selecting one of the two or more cells as a primary cell and at least another of the two or more cells as a secondary cell;
receiving measurement information related to CoMP operation from the one or more user equipment devices on a feedback channel of the primary cell only, and from one or more secondary cells; and
deactivating one or more of the cells or activating one or more additional cells for coordinated multipoint transmission based at least in part on the measurement information.

20. An article of manufacture as claimed in claim 19, wherein the measurement information comprises radio resource measurement (RRM) measurements.

21. An article of manufacture as claimed in claim 19, wherein two or more of the cells comprise different collocated antenna configurations of an enhanced Node B on a single cell site.

22. An article of manufacture as claimed in claim 19, wherein the cells are distinguished based at least in part on a physical (PHY) layer cell identification (Cell-ID).

23. An article of manufacture as claimed in claim 19 wherein the instructions, if executed, further result in determining if two or more cells are operating on the same frequency for eligibility for coordinated multipoint operation, and otherwise configuring cells operating on different frequencies for carrier aggregation.

24. An article of manufacture as claimed in claim 19, wherein the instructions, if executed, further result in designating one of the cells as a primary cell, and one or more of the cells as a secondary cell, and providing downlink scheduling or control information, or combinations thereof, to the one or more secondary cells.

25. An article of manufacture as claimed in claim 19, wherein the instructions, if executed, further result in designating one of the cells as a primary cell, and one or more of the cells as a secondary cell, and configuring channel state information reference signals (CSI-RS) on the one or more secondary cells.

26. An article of manufacture as claimed in claim 19, wherein the instructions, if executed, further result in designating one of the cells as a primary cell, and one or more of the cells as a secondary cell, and configuring uplink control channels on the one or more secondary cells.

27. An article of manufacture as claimed in claim 19, wherein the instructions, if executed, further result in receiving feedback information from one or more of the cells, or one or more of the user equipment devices, or combinations thereof, to support coordinated multipoint transmission.

\* \* \* \* \*